United States Patent
Ichikawa et al.

(10) Patent No.: US 6,690,977 B1
(45) Date of Patent: Feb. 10, 2004

(54) DATA PROCESSOR AND DATA PROCESSING METHOD FOR WAVEMETER

(75) Inventors: Akio Ichikawa, Kanagawa (JP); Kenji Mogi, Osaka (JP)

(73) Assignees: Ando Electric Co., Ltd., Kanagawa (JP); Loarant Co., Osaka (JP)

( * ) Notice: Subject to any disclaimer, the term of this patent is extended or adjusted under 35 U.S.C. 154(b) by 464 days.

(21) Appl. No.: 09/677,099

(22) Filed: Sep. 29, 2000

(30) Foreign Application Priority Data

Sep. 30, 1999 (JP) ........................................ P. 11-280514

(51) Int. Cl.$^7$ .............................................. G05B 13/02
(52) U.S. Cl. ........................... 700/46; 700/195; 702/75; 702/76; 702/77; 356/300; 356/451
(58) Field of Search ................... 700/46, 195; 356/451, 356/300; 702/77, 76, 75

(56) References Cited

U.S. PATENT DOCUMENTS 5,576,978 A * 11/1996 Kitayoshi ................... 702/77

FOREIGN PATENT DOCUMENTS

| DE | 44 17 406 C2 | 11/1995 |
|---|---|---|
| DE | 196 54 244 A1 | 7/1997 |
| DE | 197 27 288 A1 | 1/1999 |
| DE | 197 51 218 A1 | 5/1999 |
| DE | 198 02 193 A1 | 7/1999 |

* cited by examiner

*Primary Examiner*—Ramesh Patel
*Assistant Examiner*—Thomas Pham
(74) *Attorney, Agent, or Firm*—Fish & Richardson P.C.

(57) ABSTRACT

A DSP#B 6 executes, prior to data conversion, interpolation (see FIG. 2) in order to interpolate discrete spectra obtained via the FFT processing by a DSP#A 5. In the interpolation, the DSP#B 6 executes two-point interpolation if the difference between two discrete spectrum data pieces F(j) and F(j+1) is greater than a predetermined threshold $\epsilon$ and four-point interpolation if the difference is smaller than $\epsilon$.

2 Claims, 3 Drawing Sheets

SPECTRUM GENERATED BY FFT

INTERPOLATION AREA

DATA PROCESSOR AND DATA PROCESSING METHOD FOR WAVEMETER

BACKGROUND OF THE INVENTION

1. Field of the Invention

The present invention relates to a data processor for a wavemeter which executes data processing to display optical frequencies/wavelengths of optical signals measured by the wavemeter and to a data processing method for the wavemeter.

2. Description of the Related Art

In recent years, a sudden increase in data communication demands has required higher-capacity optical communications. In order to meet this demand, the Wavelength Division Multiplexing (WDM) transmission technology has come into service and has been upgraded actively. Higher-performance wavemeters are needed in order to evaluate transmission systems and optical devices utilizing the WDM transmission technology.

In a conventional wavemeter used for evaluating transmission systems and optical devices utilizing the WDM transmission technology, a series of processing steps described below are repeated sequentially: digital interference signal data obtained via A/D sampling of interference signals input from an interferometer is temporarily stored in a buffer; the digital interference data stored in the buffer is read by the Digital Signal Processor (DSP) to convert the data to frequency data; and the frequency data is further converted to optical frequency data or optical wavelength data.

Some of the conventional wavemeters utilize the fast Fourier Transform (FFT) processing when the DSP converts digital interference data to frequency data. In the FFT processing, chronological digital interference signal data is divided by predetermined period and output as frequency data.

However, as a feature of the FFT processing, discontinuous points present in chronological digital interference data cause frequency data to be displayed in the data obtained via FFT processing. To cope with this, a conventional FFT processing includes a process in which digital interference signal data prior to FFT processing is multiplied by the hamming windowing function coefficient for correcting discontinuous points.

Interpolation of discrete spectra is made to investigate detailed spectrum components of discrete spectra after FFT processing. In the interpolation, an interpolation spectrum for interpolating discrete spectra is obtained by using the optical viewpoint according to the frequency sampling theorem. Moreover, in the frequency sampling theorem, two discrete spectrum points before and after an interpolation area, that is, four points of discrete spectra in total are used to calculate an interpolation spectrum.

However, the four-point interpolation of discrete spectra after FFT processing using the conventional frequency sampling theorem has a problem because discontinuous points occur between a discrete spectrum and an interpolating spectrum.

This problem is related to an interpolation kernel obtained in the four-point interpolation. In the interpolation calculation, the interpolation calculation performed in the proximity of physically referenced discrete spectra is most seriously affected by the discrete spectra. Based on this fact, discontinuous points can be suppressed by obtaining two-point interpolation kernel from two discrete spectrum points before and after an interpolation area.

SUMMARY OF THE INVENTION

An object of the invention is to suppress occurrence of discontinuous points between a discrete spectrum and an interpolation spectrum in an interpolation area by performing two-point interpolation for obtaining two-point interpolation kernel in the interpolation of discrete spectra after FFT processing, as necessary.

According to a first aspect of the invention, there is provided a data processor for a wavemeter which processes interference signals of said optical signals in order to display optical frequencies/wavelengths of optical signals measured by the wavemeter, characterized in that the data processor comprises:

a first data conversion means for converting the interference signals to digital interference signal data (for example, A/D sampler 3 in FIG. 1), a second data conversion means for executing the fast Fourier transform processing on digital interference signals converted by the first data conversion means to convert the digital interference signal data to frequency data (for example, DSP#A 5 in FIG. 1), and an interpolation means for executing operation to interpolate the frequency data depending on the trend of variation in the frequency data converted by the second data conversion means and for interpolating and outputting the frequency data by using the interpolation data thus obtained (for example, DSP #A6 in FIG. 1).

According to the first aspect of the invention, in a data processor for a wavemeter which executes data processing to display optical frequencies/wavelengths of optical signals measured by the wavemeter, the first data conversion means converts the interference signals to digital interference signal data, the second data conversion means executes the fast Fourier transform processing on digital interference signals converted by the first data conversion means to convert the digital interference signal data to frequency data, and the interpolation means executes operation to interpolate the frequency data depending on the trend of variation in the frequency data converted by the second data conversion means and interpolates and outputs the frequency data by using the interpolation data thus obtained.

According to a second aspect of the invention, there is provide data processing method for a wavemeter which processes interference signals of said optical signals in order to display optical frequencies/wavelengths of optical signals measured by the wavemeter, characterized in that the data processing method comprises:

a first data conversion step for converting the interference signals to digital interference signal data, a second data conversion step for executing the fast Fourier transform processing on digital interference signals converted by the first data conversion step to convert the digital interference signal data to frequency data, and an interpolation step for executing operation to interpolate the frequency data depending on the trend of variation in the frequency data converted by the second data conversion step and for interpolating and outputting the frequency data by using the interpolation data thus obtained.

According to the second aspect of the invention, a data processing method for a wavemeter which executes data processing to display optical frequencies/wavelengths of optical signals measured by the wavemeter comprises a first data conversion step for converting the interference signals to digital interference signal data, a second data conversion step for executing the fast Fourier transform processing on digital interference signals converted by the first data conversion step to convert the digital interference signal data to frequency data, and an interpolation step for executing operation to interpolate the frequency data depending on the trend of variation in the frequency data converted by the second data conversion step and for interpolating and outputting the frequency data by using the interpolation data thus obtained.

Thus, two-point interpolation using two-point interpolation kernel can be executed in the proximity of frequency data to be interpolated in an interpolation area, and four-point interpolation using four-point interpolation kernel can be executed in the other areas, as necessary. As a result, the interpolation spectrum shape can be continuously output while avoiding the interpolating spectrum from being negative, thus smoothing the details of spectrum shape to be displayed.

DETAILED DESCRIPTION OF THE PRESENT INVENTION

Embodiments of the invention are detailed below with reference to drawings.

FIGS. 1 to 4 show embodiment of a wavemeter according to the invention. First, the configuration of each embodiment are discussed.

Figure 1:
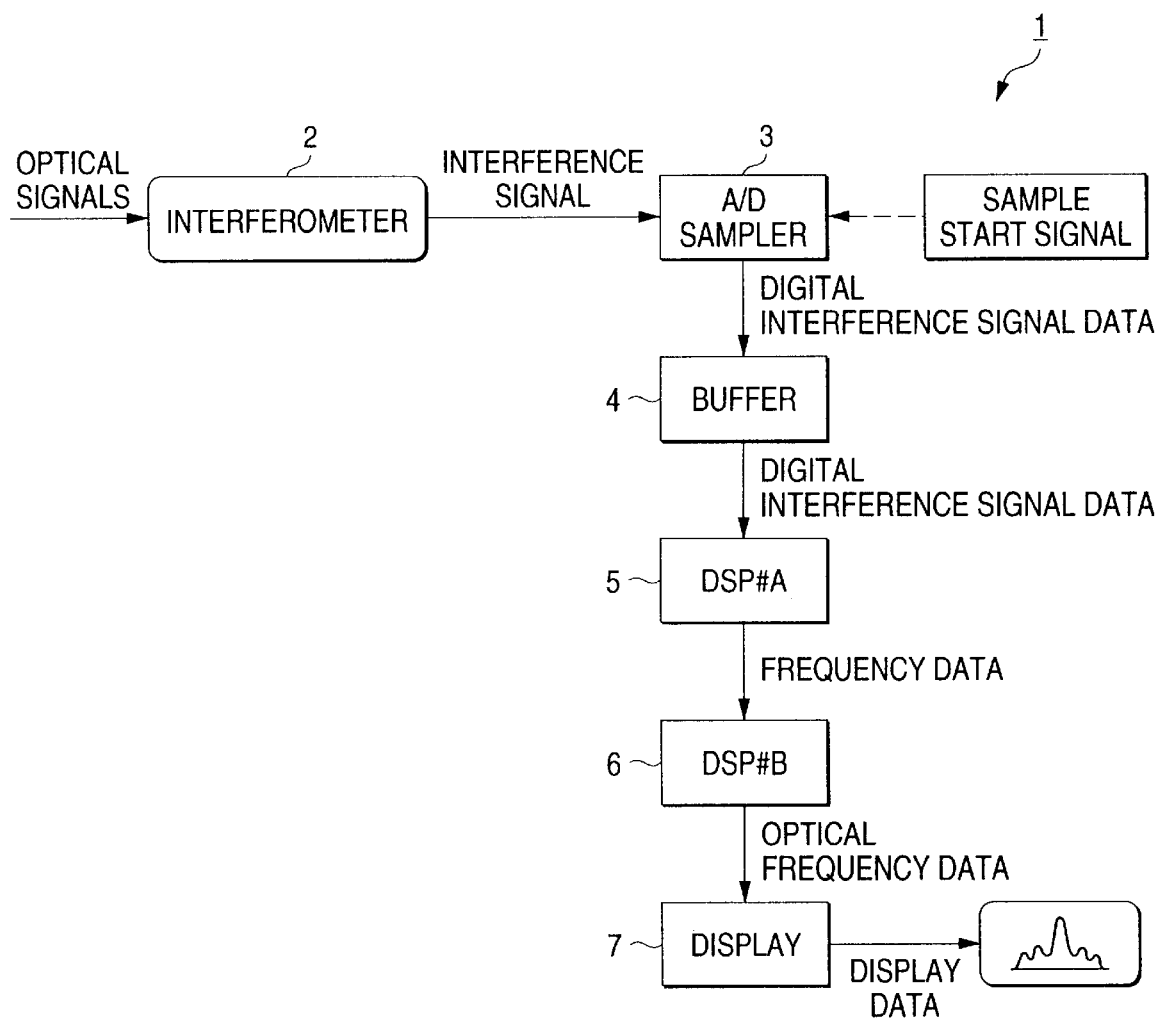
FIG. 1 is a block diagram showing the key configuration of a wavemeter 1 according to an embodiment of the invention.

FIG. 1 is a block diagram showing the general configuration of a wavemeter 1 according to the embodiment. In FIG. 1, the wavemeter 1 is composed of an interferometer 2, an A/D sampler 3, a buffer 4, a DSP#A 5, a DSP#B 6, and a display 7.

The interferometer 2 generates interference signals from measured optical signals coming from transmission systems and optical devices using the WDM transmission technology to be measured, and inputs the resulting interference signals to the A/D sampler 3.

Figure 2:
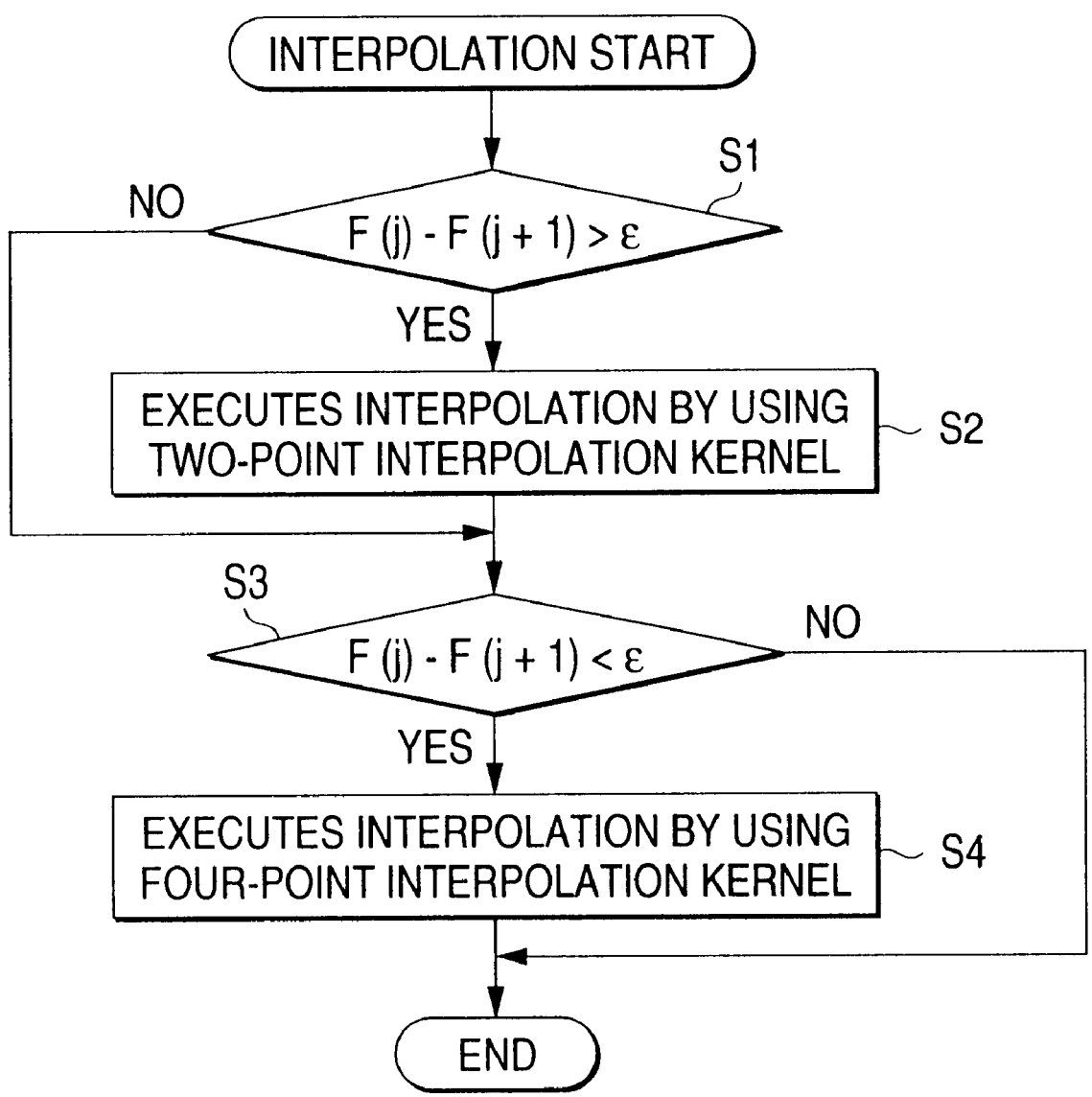
FIG. 2 is a flowchart showing interpolation executed by the DSP#B 6 in FIG. 1.

The A/D sampler 3, triggered by sample start signals input from the external circuit in FIG. 2, starts sampling the interference signals input from the interferometer 2, samples the interference signals at a preset sampling timing, performs A/D conversion on the sampled data by using predetermined number of quantizing bits to produce digital interference signal data, and specifies a write address in the buffer 4 for storing the digital interference signal data.

The buffer 4 has a memory area for storing digital interference signal data. In the buffer 4, digital interference signal data is stored at a specified write address, and digital interference signal data is read from a read address specified by a DSP#A 5.

The DSP#A 5 specifies a read address for reading digital interference signal data stored in the buffer 4 to read the data, executes the FFT processing for converting the read digital interference signal data to frequency data, then outputs the resulting frequency data to a DSP#B 6.

The DSP#A 5 applies a preset hamming windowing function coefficient to the coefficient in the first stage of the fast Fourier transform processing and executes the butterfly operation including the hamming windowing function coefficient to convert digital interference signal data to frequency data.

The DSP#A 5 comprises a memory for storing the hamming windowing function coefficient. Setting of the hamming windowing function coefficient can be changed as necessary depending on the characteristics of the digital interference signal data to be processed.

The DSP#B 6 executes the data conversion processing in which frequency data input from the DSP#A 5 is converted to optical frequency data or optical wavelength data, and outputs the resulting optical frequency data or optical wavelength data to the display 7.

The DSP#B 6 executes the interpolation as described later (see FIG. 2) in order to interpolate discrete spectra obtained via the FFT processing by the DSP#A 5. In the interpolation, the DSP#B 6 executes two-point interpolation if the difference between two discrete spectrum data pieces F(j) and F(j+1) is greater than a predetermined threshold $\epsilon$ and four-point interpolation if the difference is smaller than $\epsilon$.

The display 7 converts optical frequency data or optical wavelength data to display data and executes the display processing for displaying optical frequencies or optical wavelengths contained in optical signals input to the interferometer 2.

Operation of the embodiment is described below.

In the wavemeter 1, the interferometer 2 generates interference signals from measured optical signals coming from transmission systems and optical devices using the WDM transmission technology to be measured, and inputs the resulting interference signals to the A/D sampler 3.

The a/D sampler 3, triggered by sample start signals input from the external circuit (not shown), starts sampling the interference signals input from the interferometer 2, samples the interference signals at a preset sampling timing, performs A/D conversion on the sampled data by using predetermined number of quantizing bits to produce digital interference signal data. The A/D sampler 3 specifies a write address in the buffer 4 for storing the digital interference signal data.

The DSP#A 5 specifies a read address for reading digital interference signal data stored in the buffer 4 to read the data, and executes the butterfly operation including a preset hamming windowing function coefficient to convert digital interference signal data to frequency data, then outputs the frequency data to the DSP#B 6.

The DSP#B 6 executes the data conversion processing in which frequency data input from the DSP#A 5 is converted to optical frequency data or optical wavelength data, and outputs the resulting optical frequency data or optical wavelength data to the display 7.

The DSP#B 6 executes the interpolation in order to interpolate discrete spectra obtained via the FFT processing by the DSP#A 5. The interpolation is described based on the flowchart in FIG. 2.

In FIG. 2, the DSP#B 6 determines whether the difference (F(j)−(j+1)) between two discrete spectrum data pieces F(j) and F(j+1) is greater than a predetermined threshold $\epsilon$ or not (step S1). In case that the difference is greater than the threshold ε, the DSP#B 6 uses two-point interpolation kernel to execute two-point interpolation (step S2).

If the difference is not larger than the threshold ε, in step S3, the DSP#B 6 determines whether the difference is smaller than the threshold ε or not. If the difference is smaller than the threshold ε, the DSP#B 6 uses four-point interpolation kernel to execute four-point interpolation. If the difference is identical with the threshold ε, the DSP#B 6 cancels the interpolation and proceeds to the interpolation of the next interpolation area.

Figure 3:
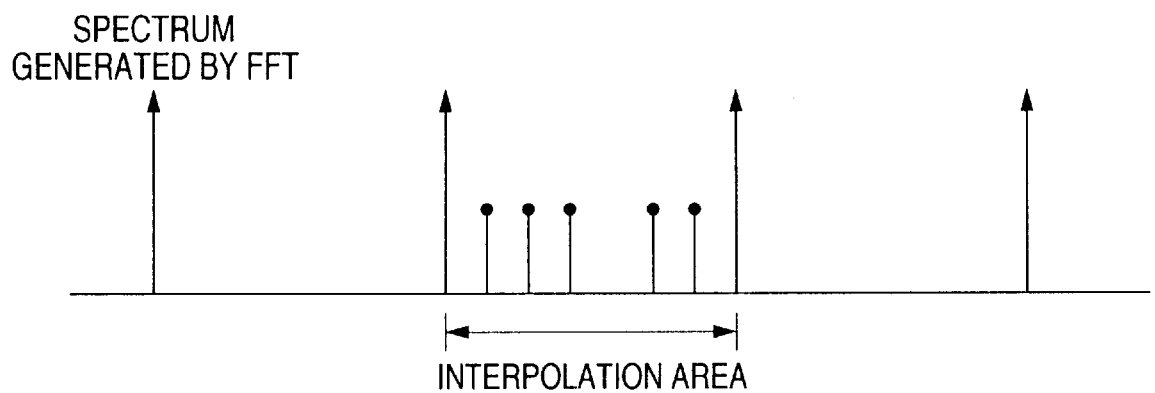
FIG. 3 shows an example of discrete spectra in the interpolation area where interpolation is executed by the DSP#B 6 in FIG. 1.
Figure 4:
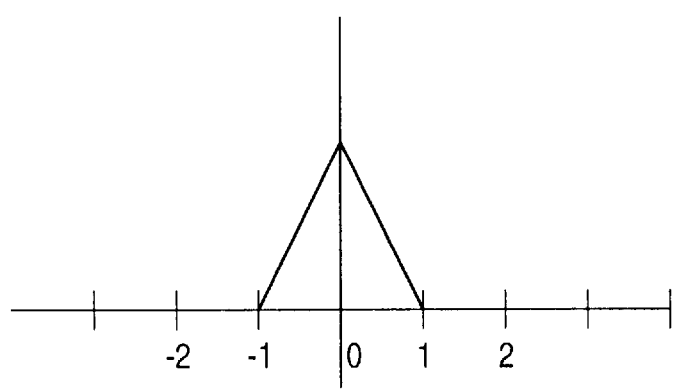
FIG. 4 shows the shape of an interpolation spectrum for two-point interpolation according to the invention.

FIG. 3 shows an example of discrete spectra in the interpolation area where interpolation is executed by the DSP#B 6. FIG. 4 shows the shape of an interpolation spectrum for two-point interpolation.

Application of two-point interpolation is described below. Obtaining an interpolation spectrum by using four-point interpolation kernel from discrete spectrum as in the conventional approach may provide a negative spectrum as interpolation calculation results, in a section where discrete spectrum variation is large. The original discrete spectra are results of FFT processing and have positive values representing a spectrum power. To avoid occurrence of negative spectrum in the course of interpolation, two-point interpolation kernel is employed in the invention which is most seriously affected by discrete spectra, based on the aforementioned fact, or the fact that the interpolation calculation performed in the proximity of physically referenced discrete spectra is most seriously affected by the discrete spectra.

Thus, in the interpolation, If the difference between two discrete spectrum data pieces F(j) and F(j+1) to be interpolated in the interpolation area is greater than a predetermined threshold ε, two-point interpolation using two discrete spectrum data pieces as two-point interpolation kernel is executed, expecting that the interpolation spectrum obtained from the interpolation calculation will have a negative value.

If the difference is smaller than a predetermined threshold ε, four-point interpolation using four discrete spectrum data pieces as four-point interpolation kernel is executed, expecting that the interpolation spectrum obtained from the interpolation calculation will have a positive value.

Thus, by selectively executing two-point interpolation using two-point interpolation kernel or four-point interpolation using four-point interpolation kernel depending on the trend of variation in the discrete spectrum data to be interpolated in the interpolation area, the interpolation spectrum shape can be continuously output while avoiding the interpolating spectrum from being negative, thus smoothing the details of spectrum shape to be displayed.

The display 7 converts optical frequency data or optical wavelength data to display data and executes the display processing for displaying optical frequencies contained in optical signals input to the interferometer 2.

Thus, in the wavemeter 1 according to the embodiment, the DSP#B 6 selectively executes two-point interpolation using two-point interpolation kernel or four-point interpolation using four-point interpolation kernel depending on the trend of variation in the discrete spectrum data to be interpolated in the interpolation area. Accordingly, two-point interpolation using two-point interpolation kernel can be executed in the proximity of discrete spectra to be interpolated in the interpolation area, and four-point interpolation using four-point interpolation kernel can be executed in the other areas, as necessary.

As a result, the interpolation spectrum shape can be continuously output while avoiding the interpolating spectrum from being negative, thus smoothing the details of spectrum shape to be displayed on the display 7.

Although the foregoing embodiment of the invention assumes that the DSP is composed of two stages, it is to be understood that a DSP composed of a single stage can reduce data processing time also.

According to a data processor and a data processing method for a wavemeter of the invention, two-point interpolation using two-point interpolation kernel can be executed in the proximity of frequency data to be interpolated in an interpolation area, and four-point interpolation using four-point interpolation kernel can be executed in the other areas, as necessary. As a result, the interpolation spectrum shape can be continuously output while avoiding the interpolating spectrum from being negative, thus smoothing the details of spectrum shape to be displayed.

What is claimed is:

1. A data processor for a wavemeter processing a interference signal of optical signals to display a optical frequency/wavelength of the optical signals measured by the wavemeter, the data processor comprising:

a first data conversion means for converting the interference signal to a digital interference signal data;

a second data conversion means for executing the fast Fourier transform processing on the digital interference signal data to convert the digital interference signal data to a frequency data, and an interpolation means for calculating an interpolation data to be interpolated from the frequency data depending on the trend of variation in the frequency data, the interpolation means for interpolating the interpolation data in the frequency data to output the frequency data interpolated, wherein the interpolation means reduces the number of interpolation data to be interpolated if the difference between a first frequency value and a second adjacent frequency value is greater than a predetermined threshold, and wherein the interpolation means increases the number of interpolation data to be interpolated if the difference between the first and second frequency values is smaller than a predetermined threshold.

2. A data processing method for a wavemeter processing an interference signal of optical signals to display an optical frequency/wavelength of the optical signals measured by the wavemeter, the data processing method comprising:

converting the interference signal to a digital interference signal data;

executing a fast Fourier transform processing on the digital interference signal data to convert the digital interference signal data to frequency data;

calculating an interpolation data to be interpolated from the frequency data depending on the trend of variation in the frequency data; and interpolating the interpolation data in the frequency data to output the frequency data interpolated, wherein the number of interpolation data to be interpolated is reduced if the difference between a first frequency value and a second adjacent frequency value is greater than a predetermined threshold, and wherein the number of interpolation data to be interpolated is increased if the difference between the first and second frequency values is smaller than a predetermined threshold.

* * * * *